United States Patent
Dudar

(10) Patent No.: US 10,156,220 B1
(45) Date of Patent: Dec. 18, 2018

(54) METHOD AND SYSTEM FOR KNOCK SENSOR DIAGNOSTIC

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/891,946

(22) Filed: Feb. 8, 2018

(51) Int. Cl.
| | |
|---|---|
| *F02P 5/152* | (2006.01) |
| *F02D 41/22* | (2006.01) |
| *F02D 41/00* | (2006.01) |
| *F02P 23/04* | (2006.01) |
| *F02N 11/08* | (2006.01) |
| *F02P 7/077* | (2006.01) |
| *F02N 19/00* | (2010.01) |

(52) U.S. Cl.
CPC ........ *F02P 5/1526* (2013.01); *F02D 41/0002* (2013.01); *F02D 41/222* (2013.01); *F02N 11/0814* (2013.01); *F02N 19/005* (2013.01); *F02P 7/077* (2013.01); *F02P 23/04* (2013.01); *F02N 2019/008* (2013.01)

(58) Field of Classification Search
CPC .......... F02P 5/1526; F02P 7/077; F02P 23/04; F02N 19/005; F02N 11/0814; F02N 2019/008; F02D 41/0002; F02D 41/222
See application file for complete search history.

(56) References Cited

U.S. PATENT DOCUMENTS

| | | | |
|---|---|---|---|
| 4,476,709 A | 10/1984 | Hattori et al. | |
| 4,770,143 A * | 9/1988 | Takahashi | F02P 5/1526 |
| | | | 123/406.16 |
| 5,343,843 A | 9/1994 | Hamren | |
| 5,421,191 A | 6/1995 | Pyko et al. | |
| 7,562,558 B2 | 7/2009 | Homer et al. | |
| 7,769,536 B2 | 8/2010 | Hamama et al. | |
| 8,042,510 B2 | 10/2011 | Martin et al. | |
| 8,086,391 B2 | 12/2011 | Miah | |
| 2011/0144884 A1 | 6/2011 | Miah | |
| 2013/0118447 A1 | 5/2013 | Martin et al. | |

(Continued)

FOREIGN PATENT DOCUMENTS

EP    3054134 A1    8/2016

OTHER PUBLICATIONS

Xiao, B. et al., "Method and System for Boosted Engine System," U.S. Appl. No. 15/474,813, filed Mar. 30, 2017, 78 pages.

(Continued)

*Primary Examiner* — Hung Q Nguyen
*Assistant Examiner* — Xiao Mo
(74) *Attorney, Agent, or Firm* — Julia Voutyras; McCoy Russell LLP

(57) ABSTRACT

Methods and systems are provided for diagnosing a knock sensor of an engine system by actively inducing knock in an engine cylinder. A laser ignition device is operated in an engine cylinder located closest to the knock sensor while the engine is at rest and with the cylinder parked with an intake valve and an exhaust valve closed to generate and trap heat in the cylinder. Spark timing is advanced in the cylinder on the subsequent restart, which in combination with the trapped heat induces knock, and elicits a response from a functional knock sensor.

20 Claims, 4 Drawing Sheets

(56) References Cited

U.S. PATENT DOCUMENTS

2013/0255651 A1* 10/2013 Nomura ................ F02B 23/00
                                                                  123/668
2018/0087483 A1    3/2018 Miller et al.

OTHER PUBLICATIONS

Xiao, B. et al., "Method and System for Boosted Engine System," U.S. Appl. No. 15/474,868, filed Mar. 30, 2017, 78 pages.
Dudar, A., "Method For Engine Laser Ignition System," U.S. Appl. No. 15/793,246, filed Oct. 25, 2017, 39 pages.
Dudar, A., "Method For Engine Laser Ignition System," U.S. Appl. No. 15/822,525, filed Nov. 27, 2017, 57 pages.

\* cited by examiner

METHOD AND SYSTEM FOR KNOCK SENSOR DIAGNOSTIC

FIELD

The present description relates generally to methods and systems for diagnosing a knock sensor of an engine.

BACKGROUND/SUMMARY

As engines age, carbon buildup inside them can cause engine compression ratios to increase. As a result, spontaneous combustion (such as pre-ignition) and/or knock can occur more frequently. Engines may be configured with a knock sensor coupled to the engine block for detecting engine knock. The knock sensor may be a piezoelectric device that outputs a voltage (e.g., in the range of 5-18 khz) upon excitation. The sensor uses engine vibrations for excitation and does not need external power supply. In response to knock detection by the sensor (such as when the sensor output is higher than a knock threshold), an engine controller may adjust (e.g., retard) spark timing to reduce the likelihood of further knock. To ensure timely knock detection and mitigation, knock sensors may be periodically diagnosed.

Various approaches have been developed to diagnose knock sensors. One example approach shown by Bizub in EP 3054134 A1 relies on comparison of knock sensor to crankshaft speed data. In particular, one or more engine knock events are derived from the knock sensor data, and then it is determined whether the one or more knock events actually took place at a known time or a known crankshaft position. Another approach shown by Homer et al. in U.S. Pat. No. 7,562,558. Therein, a signal generator generates and applies a test signal with a predetermined frequency to a knock sensor. Based on an amplitude of the test signal, as detected by a circuit associated with the knock sensor, a controller determines if the knock sensor's circuit is open or short.

However, the inventors herein have identified potential issues with such approaches. The approach of Bizub relies on the inherent occurrence of engine knock for knock sensor diagnosis. However, since engine knocking occurs more often with an increased resulting compression ratio, or in the presence of elevated temperatures, the knock sensor diagnosing opportunities may be limited. For example, knock may not present itself until the engine is being operated at high load conditions such as during highway driving or towing applications. The knock sensor diagnosing opportunities may be even more limited in city drive cycles and engines with start/stop applications. As a result, there may be situations where the knock sensor needs to be diagnosed (such as to meet OBD requirements), but cannot be diagnosed at that time due to lack of knock generating engine conditions.

In the approach of Horner, even though the knock output is induced via the test signal, the test signal can only be applied during conditions when the knock output induced via the test signal does not interfere with knock output due to actual engine vibration. Further, in both approaches, the knock sensor may output a flat zero voltage if there is no natural vibration from engine combustion. It may not be clear if the zero output is due to a degraded sensor or due to lack of physical knock. If the knock sensor is not timely diagnosed, knock may go undetected and/or the engine controller may adjust the spark timing in a less than optimum manner, causing engine performance issues, fuel economy loss, and elevated tailpipe emissions.

In one example, the issues described above may be addressed by a method comprising: inducing a knock event in a cylinder via operation of a laser ignition device; and diagnosing a knock sensor based on knock sensor output following the induced knock event. In this way, an engine knock sensor may be reliably diagnosed.

As one example, an engine system may be configured with laser ignition and start/stop capabilities. Responsive to idle-stop conditions being met, the engine may be shut-down and spun towards rest. In particular, the engine may be shut-down with a cylinder located closest to the engine's knock sensor parked in a sealed position when the engine comes to rest. The sealed position may include a position where each of the intake valve and the exhaust valve of the cylinder is closed, such as at a top dead center of an exhaust stroke of the cylinder. While the engine rests at that position, a laser igniter may be operated (e.g., for a duration) to generate heat in the cylinder. If the laser is maneuverable, a beam direction and focal point may be adjusted on different regions of the cylinder (e.g., at random or targeted) so as to generate heat throughout the cylinder. Since both the intake and the exhaust valve are closed, the generated heat is trapped in the cylinder. When engine restart conditions met, engine fueling is resumed while spark timing is advanced for the given cylinder. The combination of trapped heat and spark advance induces knock in the given cylinder during the engine restart. The knock sensor output is observed to determine if the sensor responds to the induced knock. If sensor output is not observed, it may be inferred that the sensor is degraded.

In this way, an engine knock sensor may be diagnosed by inducing knock in an engine cylinder during an engine restart. By using a laser ignition of the engine system to generate and trap heat in a cylinder while an engine is shut-down, existing engine components can be leveraged for inducing knock. By using laser-generated heat and spark advance to induce knock in a cylinder, an engine controller does not need to wait for specific conditions where knock inherently occurs. Consequently, a knock sensor may be diagnosed more frequently, including when required. By diagnosing a knock sensor in a timely and more reliably manner, knock mitigating spark retard can be scheduled more optimally, fuel economy losses can be reduced, and tailpipe emissions can be better controlled.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
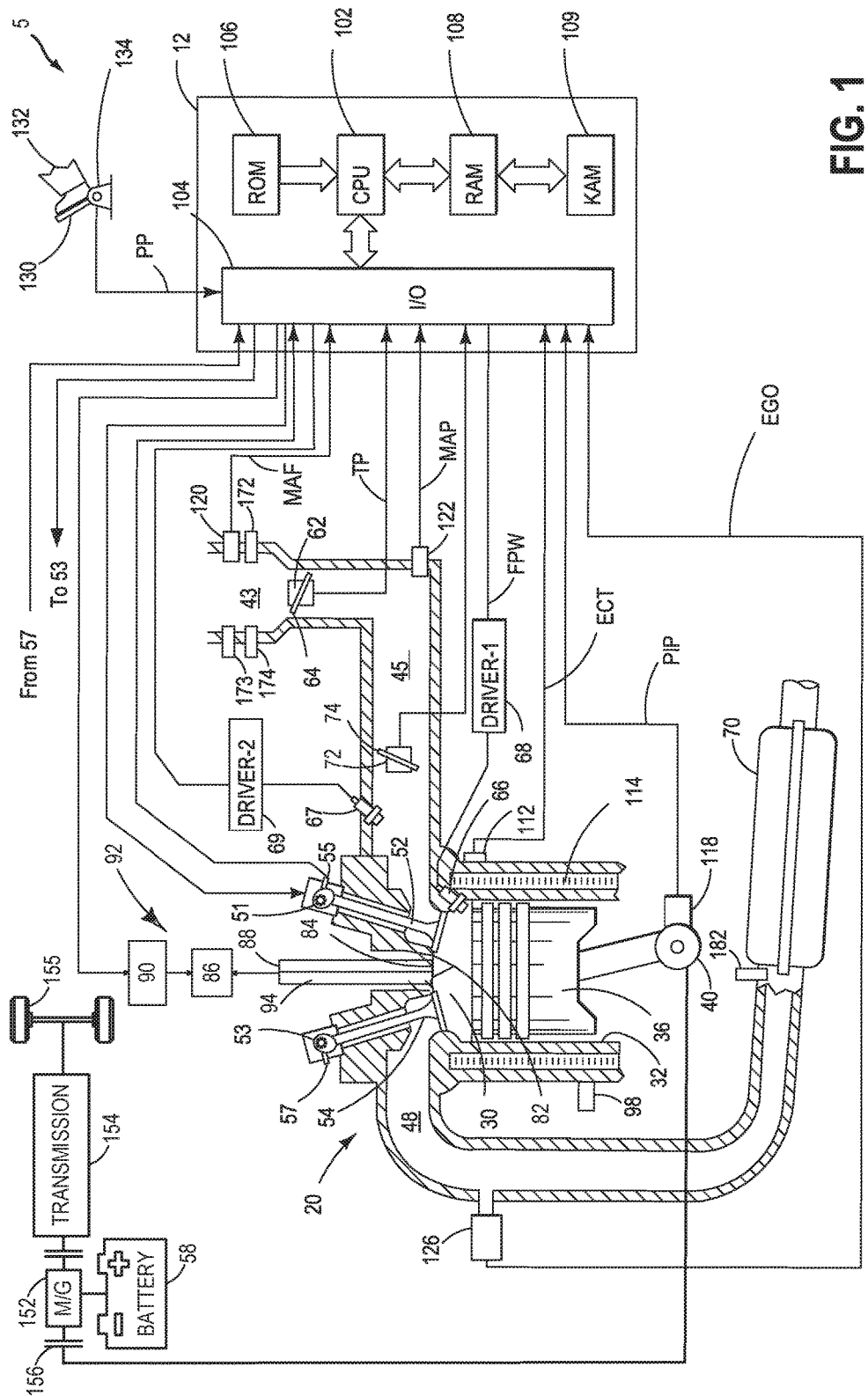
FIG. 1 shows a schematic depiction of an example vehicle system having an engine configured with laser ignition.

The following description relates to systems and methods for diagnosing an engine knock sensor by inducing cylinder knock via a laser ignition system, such as the ignition system coupled to the engine system of FIG. 1. In response to idle-stop conditions being met, while the engine is being shut-down and spun to rest, an engine controller may perform a control routine, such as the example routine of FIG. 2, to generate heat in a selected cylinder via operation of a laser igniter. The controller may operate the laser igniter after parking the selected cylinder in a position where the cylinder is sealed, with each of an intake valve and an exhaust valve of the cylinder held closed, as shown with reference to FIG. 3, so that the generated heat can be trapped in the cylinder while the engine is at rest. Then, when the engine is restarted, knock may be induced in the given cylinder via a combination of the trapped heat and the selective use of spark timing advance. The knock sensor may be diagnosed based on knock sensor output following the induced knock event. An example knock sensor diagnostic operation is shown with reference to FIG. 4.

Turning to FIG. 1, an example hybrid propulsion system is depicted. The hybrid propulsion system may be configured in a passenger on-road vehicle, such as hybrid electric vehicle 5. The hybrid propulsion system includes an internal combustion engine 20. Engine 20 may be a multi-cylinder internal combustion engine, one cylinder of which is depicted in detail at FIG. 1. Engine 20 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 20 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel 155 of vehicle 5 via an intermediate transmission system 154. Combustion cylinder 30 may receive intake air from intake manifold 45 via intake passage 43 and may exhaust combustion gases via exhaust passage 48. Intake manifold 45 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In the example shown, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. To enable detection of cam position, cam actuation systems 51 and 53 may have toothed wheels. The position of intake valve 52 and exhaust valve 54 may be determined by cam position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. Fuel injector 67 is shown arranged in intake passage 43 in a configuration that provides what is known as port injection of fuel into the intake port upstream of combustion cylinder 30. Fuel injector 67 delivers fuel into the intake port in proportion to the pulse width of signal FPW-2 received from controller 12 via electronic driver 69. In this manner, fuel injector 67 provides what is known as port injection of fuel into combustion cylinder 30.

Intake passage 43 may include a charge motion control valve (CMCV) 74 and a CMCV plate 72 in addition to a throttle 62 having a throttle plate 64. In this particular example, the position of throttle plate 64 may be varied by controller 12 via a signal (TP) provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 43 may include a mass air flow sensor 120 and a manifold air pressure sensor 122 for providing respective signals MAF and MAP to controller 12.

Intake passage 43 may also include one or more temperature and/or pressure sensors for estimating ambient conditions. For example, intake passage 43 may include an intake air temperature (IAT) sensor 172 for estimating a temperature of intake air drawn into the intake manifold and thereon into engine cylinders. Intake passage 43 may further include a barometric pressure sensor 173 for estimating ambient pressure, and a humidity sensor 174 for estimating ambient humidity. During engine operation, one or more engine operating parameters may be adjusted based on the ambient temperature, pressure, and/or humidity, such as throttle position, engine dilution, valve timing, etc.

Exhaust gas sensor 126 is shown coupled to exhaust passage 48 upstream of an emission control device 70. Emission control device (ECD) 70 may include one or more catalytic converters and particulate matter filters. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air/fuel ratio sensors. ECD 70 can include multiple catalyst bricks, in one example. In another example, multiple emission control devices, each with multiple bricks, can be used. ECD 70 can be a three-way type catalyst in one example.

In still further example, ECD 70 may include a particulate matter filter for retaining particulate matter (PM) emissions, such as soot and ash, from exhaust gas, before the gas is released to the atmosphere via a tailpipe. The filter may include one or more temperature and/or pressure sensors, such as temperature sensor 182, for estimating a PM load on the filter. The sensor may be coupled to the filter or multiple sensors may be coupled across the filter. For example, the PM load may be inferred based on a pressure or temperature differential across the filter.

Engine 20 may further include a knock sensor 98 coupled to combustion chamber 30. It will be appreciated that engine 20 may have a plurality of knock sensors 98 distributed along a body of the engine (e.g., along an engine block). When included, the plurality of knock sensors may be distributed symmetrically or asymmetrically along the engine block. For example, a knock sensor may be coupled to each engine cylinder. As another example, a single knock sensor may be provided for an engine, or an engine bank, the single knock sensor coupled to one engine cylinder. When a single sensor is included, the positioning of the sensor may be selected during engine manufacture based on testing data such that knock can be reliably detected in all engine cylinders via the single knock sensor. In still other examples, a first knock sensor may be coupled at a first location on the engine block to detect knock in a first set of cylinders while a second knock sensor is coupled at a second, different location on the engine block to detect knock in a second, different set of cylinders. Knock sensor 98 may be an accelerometer, an ionization sensor, or a vibration sensor. Controller 12 may be configured to detect and differentiate engine block vibrations generated due to abnormal combustion events, such as knocking and pre-ignition based on the output (e.g., signal timing, amplitude, intensity, frequency, etc.) of knock sensor 98. The controller may assess the sensor outputs in different timing windows that are cylinder specific and that are based on the nature of the vibration being detected. For example, abnormal cylinder combustion events due to knock occurring in a firing cylinder may be identified by knock sensor outputs sensed in a window that is after a spark event of the cylinder while abnormal cylinder combustion events due to pre-ignition may be identified by knock sensor outputs sensed in a window that is before a spark event of the cylinder. In one example, the windows in which the knock signals are estimated may be crank angle windows. In addition, the threshold for pre-ignition may be higher than the threshold for knock.

Upon differentiation, knock and pre-ignition may also be addressed via distinct mitigating actions. For example, knock may be addressed by retarding spark timing while pre-ignition may be addressed via fuel enrichment or fuel enleanment.

Figure 4:
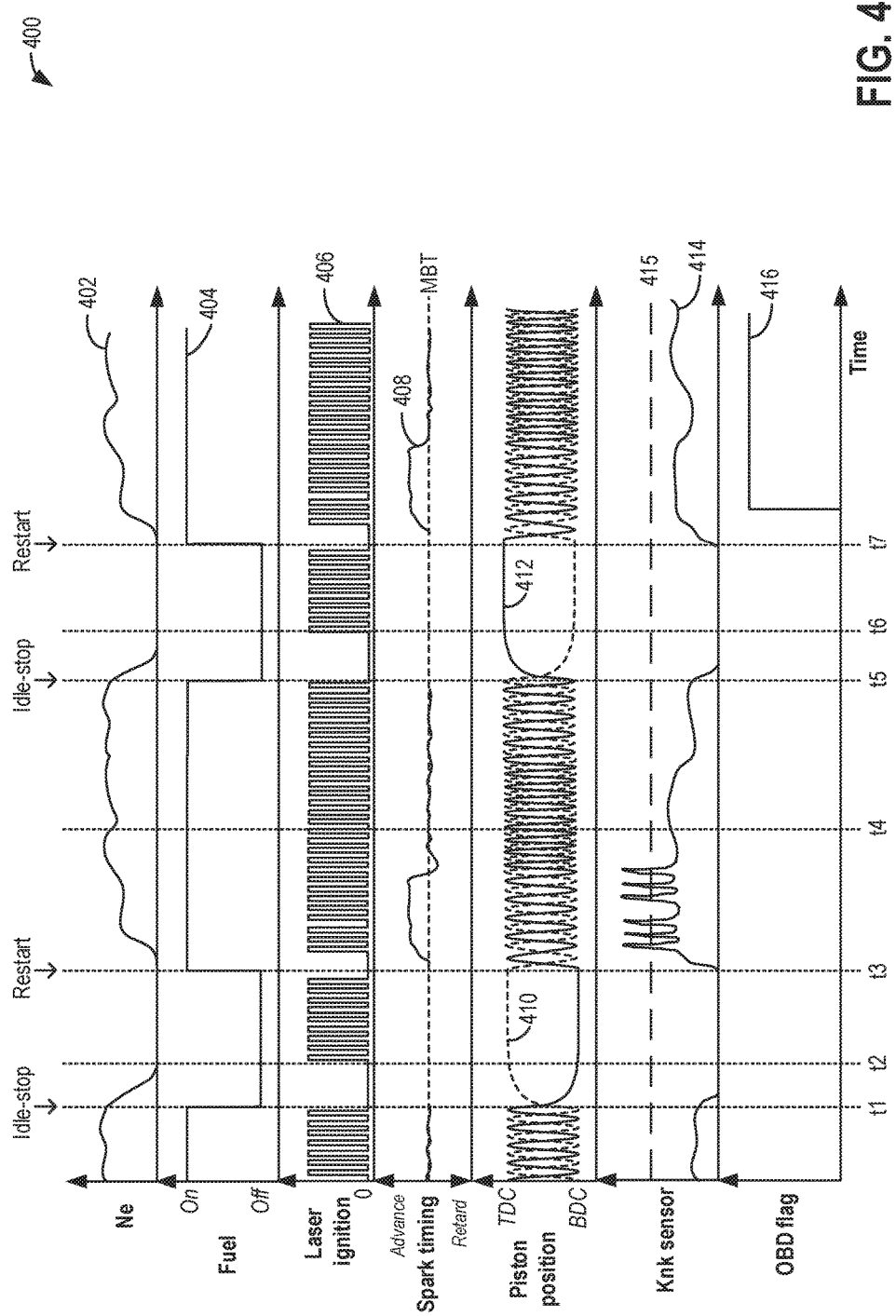
FIG. 4 shows a prophetic example of diagnosing engine knock sensors by inducing cylinder knock via a laser ignition system.

To enable engine vibrations to be reliably determined and addressed, knock sensor 98 may be periodically diagnosed. As elaborated herein with reference to FIG. 2, the engine controller may diagnose knock sensor 98 by actively inducing knock via the laser ignition system. In particular, when the engine is shutdown, laser igniter operation may be used to generate heat in a cylinder located closest to the knock sensor to be diagnosed, and the heat is trapped by sealing the cylinder via closure of its intake and exhaust valve. When the engine is restarted, fueling is resumed with spark timing provided to the cylinder advanced. The combination of trapped heat and spark advance is used to induce knock in the cylinder, and an output of the knock sensor 98 is used for sensor diagnostic. An example diagnostic operation is shown at FIG. 4.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 109, and a data bus. The controller 12 may receive various signals and information from sensors coupled to engine 20, in addition to those signals previously discussed, including measurement of inducted mass air flow (MAF) from mass air flow sensor 120; engine coolant temperature (ECT) from temperature sensor 112 coupled to cooling sleeve 114; in some examples, a profile ignition pickup signal (PIP) from Hall effect sensor 118 (or other type) coupled to crankshaft 40 may be optionally included; throttle position (TP) from a throttle position sensor; absolute manifold pressure signal, MAP, from sensor 122, and engine vibration from knock sensor 98. The Hall effect sensor 118 may optionally be included in engine 20 because it functions in a capacity similar to the engine laser system described herein. Storage medium read-only memory 106 can be programmed with computer readable data representing instructions executable by processor 102 for performing the methods described below as well as variations thereof.

Engine 20 further includes a laser ignition system 92 for igniting an air-fuel mixture in cylinder 30. Laser ignition system 92 includes a laser exciter 88 and a laser control unit (LCU) 90. LCU 90 causes laser exciter 88 to generate laser energy. LCU 90 may receive operational instructions from controller 12. Laser exciter 88 includes a laser oscillating portion 86 and a light converging portion 84. The light converging portion 84 converges laser light generated by the laser oscillating portion 86 on a laser focal point 82 of combustion cylinder 30. In one example, light converging portion 84 may include one or more lenses.

A photodetector 94 may be located in the top of cylinder 30 as part of laser system 92 and may receive return pulses from the top surface of piston 36. Photodetector 94 may include a camera with a lens. In one example, the camera is a charge coupled device (CCD). The CCD camera may be configured to detect and read laser pulses emitted by LCU 90. In one example, when the LCU emits laser pulses in an infra-red frequency range, the CCD camera may operate and receive the pulses in the infra-red frequency range. In such an embodiment, the camera may also be referred to as an infrared camera. In other embodiments, the camera may be a full-spectrum CCD camera that is capable of operating in a visual spectrum as well as the infra-red spectrum. The camera may include a lens, such as a fish-eye lens, for focusing the detected laser pulses and generating an image of the interior of the cylinder. After laser emission from LCU 90, the laser sweeps within the interior region of cylinder 30. In one example, during cylinder laser ignition as well as during conditions when a cylinder piston position is to be determined, the laser may sweep the interior region of the cylinder at laser focal point 82. Light energy that is reflected off of piston 36 may be detected by the camera in photodetector 94.

It will be appreciated that while laser system 92 is shown mounted to a top of the cylinder, in alternate examples, the laser system may be configured with the laser exciter mounted on the side of the cylinder, substantially facing the valves.

Laser system 92 is configured to operate in more than one capacity with the timing and output of each operation based on engine position of a four-stroke combustion cycle. For example, laser energy may be utilized for igniting an air/fuel mixture during a power stroke of the engine, including during engine cranking, engine warm-up operation, and warmed-up engine operation. Fuel injected by fuel injector 66 may form an air/fuel mixture during at least a portion of an intake stroke, where igniting of the air/fuel mixture with laser energy generated by laser exciter 88 commences combustion of the otherwise non-combustible air/fuel mixture and drives piston 36 downward. Furthermore, light generated during the cylinder combustion event may be used by photodetector 94 for capturing images of an interior of the cylinder and assessing progress of the combustion event (e.g., for monitoring flame front progression).

In a second operating capacity, LCU 90 may deliver low powered pulses to the cylinder. The low powered pulses may be used to determine piston and valve position during the four-stroke combustion cycle. In addition, upon reactivating an engine from idle-stop conditions, laser energy may be utilized to monitor the position, velocity, etc. of the engine in order to synchronize fuel delivery and valve timing. Furthermore, light generated by the laser light pulse emission at the lower power may be used for capturing images of an interior of the cylinder before a cylinder combustion event occurs, such as during an intake stroke.

Controller 12 controls LCU 90 and has non-transitory computer readable storage medium including code to adjust the power output and location of laser energy delivery. Laser energy may be directed at different locations within cylinder 30. Controller 12 may also incorporate additional or alternative sensors for determining the operational mode of engine 20, including additional temperature sensors, pressure sensors, torque sensors as well as sensors that detect engine rotational speed, air amount and fuel injection quantity.

As described above, FIG. 1 shows one cylinder of multi-cylinder engine 20, and each cylinder may similarly include its own set of intake/exhaust valves, fuel injector, laser ignition system, etc.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 152. Electric machine 152 may be a motor or a motor/generator. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 140 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 58 to provide torque to vehicle wheels 155. Electric machine 152 may also be operated as a generator to provide electrical power to charge battery 58, for example during a braking operation.

The controller 12 receives signals from the various sensors of FIG. 1 and employs the various actuators of FIG. 1 to adjust engine and vehicle operation based on the received signals and instructions stored on a memory of the controller. For example, responsive to an indication of idle-stop conditions being met, such as based on pedal position sensor 134, the controller 12 may shut-down the engine. Then, the controller 12 may operate laser exciter 88 (herein also referred to as the laser igniter) for a duration while the engine is at rest to generate heat that is trapped in a corresponding cylinder that is sealed via valve closure. As another example, responsive to engine restart conditions being met, such as based on pedal position sensor 134, the controller 12 may provide fuel to the engine while advancing spark timing in the given cylinder so as to induce a knock event therein.

In this way, the components of FIG. 1 enables a vehicle system comprising an engine including a cylinder, the cylinder having a laser ignition device and a fuel injector; a knock sensor coupled to an engine block; and a controller with computer readable instructions stored on non-transitory memory for: disabling fuel to an engine and spinning the engine to rest with the cylinder parked in a position with an intake and an exhaust valve closed; operating the laser ignition device coupled to the cylinder to raise cylinder temperature to above a threshold temperature; resuming fuel delivery to the engine and combusting fuel in the cylinder with an amount of spark timing advance; and indicating degradation of the knock sensor based on sensor output following the resuming. In one example, the cylinder is one of a plurality of engine cylinders, and the controller includes further instructions for selecting the cylinder from the plurality of cylinders based on a location of the cylinder relative to the knock sensor on the engine block. Further, the position where the cylinder is parked may include a top dead center of an exhaust stroke of the cylinder.

Figure 2:
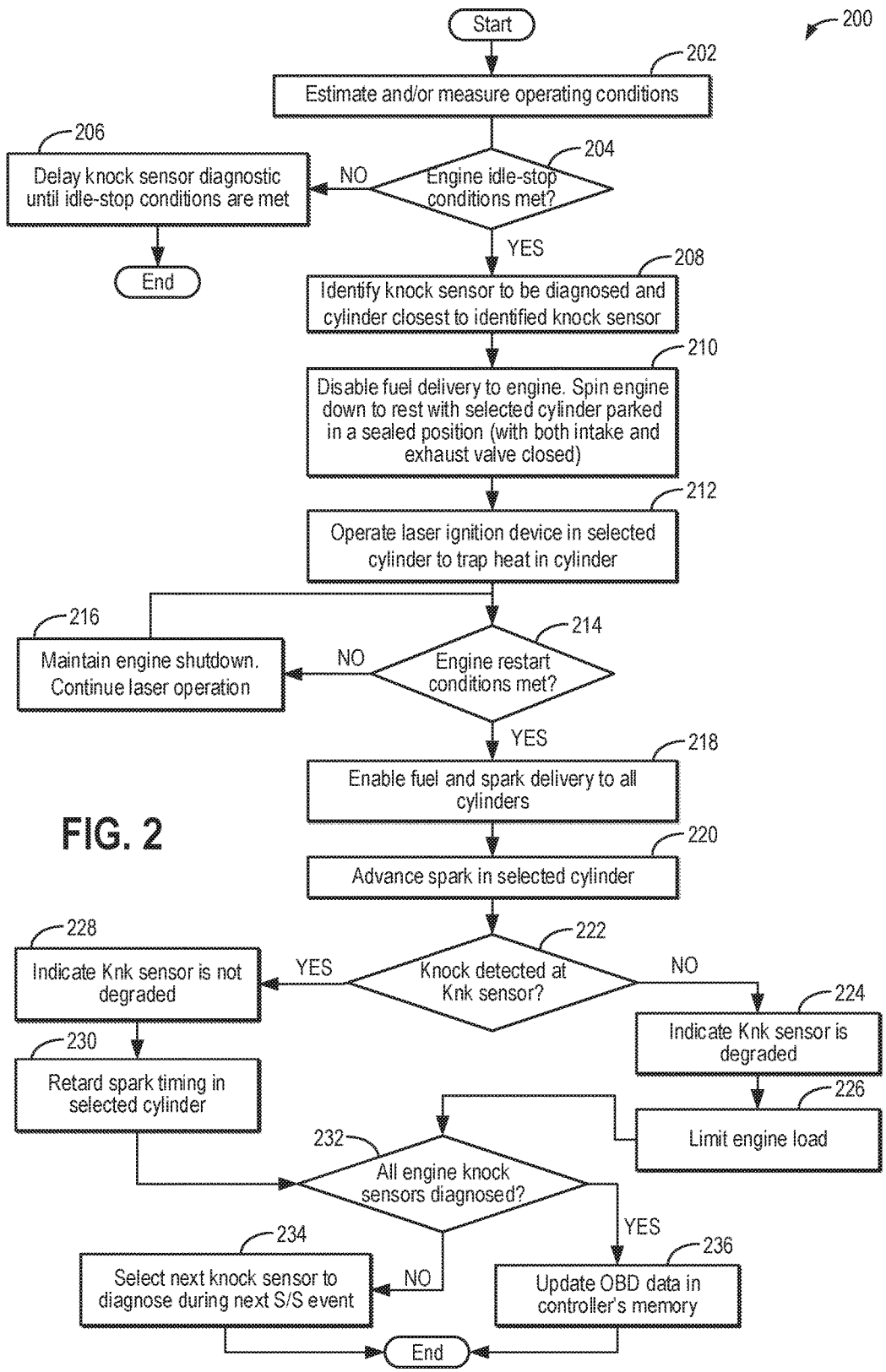
FIG. 2 depicts a high-level flow chart of an example method for diagnosing an engine knock sensor by using a laser igniter to generate and trap heat in an engine cylinder.

FIG. 2 shows an example method 200 for diagnosing an engine knock sensor by inducing knock in the engine. The knock is induced using heat generated via a laser ignition system while the engine is shut down, in combination with the use of spark advance when the engine is subsequently restarted. Instructions for carrying out method 200 may be executed by a controller (e.g., controller 12 of FIG. 1) based on instructions stored on a memory of the controller and in conjunction with signals received from sensors of the engine system, such as the sensors described above with reference to FIG. 1 (e.g., knock sensor 98 of FIG. 1). The controller may employ actuators of the engine system (e.g., laser exciter 88 of FIG. 1) to adjust engine operation according to the methods described below.

Method 200 begins at 202 and includes estimating and/or measuring engine operating conditions. Operating conditions may include, for example, ambient temperature, ambient pressure, ambient humidity, engine speed and load, throttle position (e.g., from signal TP output by a throttle position sensor), accelerator pedal position (e.g., signal PP output by a pedal position sensor), torque demand, exhaust gas air-fuel ratio (e.g., as determined from signal UEGO output by the exhaust gas sensor), engine coolant temperature, etc. Herein the engine may be configured with start/stop capabilities to reduce fuel consumption. The start/stop capabilities allow the engine to be shut-down when selected idle-stop conditions are met, such as when the vehicle is stopped and the torque demand is low; and then restarted from rest when restart conditions are met.

At 204, method 200 includes confirming engine idle-stop conditions. An engine controller may automatically, and without operator input, shut-down the engine responsive to idle-stop conditions being met. Idle-stop conditions may be considered met if a battery state of charge is above a threshold (e.g., more than 30%), a request for air-conditioner compressor operation is not received (e.g., no request for cabin cooling), engine temperature (for example, as inferred from an engine coolant temperature) is above a threshold temperature (such as above a catalyst light-off temperature), a throttle opening degree is less than a threshold, driver requested torque is less than a predetermined threshold value, brake pedal has been depressed, etc. If all of the idle-stop conditions are met, then the engine may be shutdown. If any of the engine idle-stop conditions are not met, then at 206, the method includes continuing to operate the engine, and delaying knock sensor diagnostics until idle-stop conditions are met in the current drive cycle. The method then ends.

If all of the idle-stop conditions are met, then at 208, the method includes identifying a knock sensor to be diagnosed. In one example, where the engine has a single knock sensor coupled to the engine block, the single sensor may be the knock sensor that is opportunistically diagnosed during the idle-stop operation. In another example, where the engine has multiple knock sensors coupled to the engine block, the controller may select a first knock sensor to diagnose. As such, only a single knock sensor may be diagnosed on a given idle-stop event. The first knock sensor may be selected based on a duration elapsed since a last diagnostic was run on the sensor. Alternatively, the knock sensors may be diagnosed in a predefined order based on their position along the engine block.

In addition, the controller may identify a cylinder closest to the knock sensor to be diagnosed. In one example, the selected cylinder may have a cylinder head onto which the knock sensor is coupled. In another example, the selected cylinder may be a cylinder closest to the knock sensor on the engine block. In still another example, the selected cylinder may be a cylinder whose in-cylinder vibrations are detected most reliably and strongly by the knock sensor to be diagnosed.

At 210, the method includes, responsive to the idle-stop conditions, disabling fuel delivery to the engine. For example, the controller may send a signal to engine fuel injectors disabling fuel delivery from them. As a result of disabling fuel, the engine may start spinning down to rest. The controller may adjust the spin-down speed profile of the engine so that the engine comes to rest with the selected cylinder parked in a sealed position. In particular, the sealed position may correspond to a position where both the intake valve and the exhaust valve of the selected cylinder are held closed. In one example, this position corresponds to a top dead center of an exhaust stroke of the selected cylinder. In another example, this position corresponds to a position of negative intake to exhaust valve overlap for the cylinder.

Adjusting the engine spin-down profile so that the engine comes to rest with the selected cylinder parked in a sealed position includes adjusting based on crankshaft position sensor feedback to a position that is optimized for engine pull-up. In still other examples, after the engine has spun down to rest, the controller may spin the engine, unfueled, to a position where the selected cylinder is sealed. Herein, the engine may be spun, slowly, via an electric motor (such as a starter motor or an electric machine coupled to a driveline of the hybrid vehicle) so a position where the selected cylinder is sealed. Spinning the engine includes spinning the engine in a forward direction, in the same direction of rotation as engine rotation during engine cranking and fueled engine rotation. The engine may be spun at a speed that is low enough to slowly park the engine in a position where the intake and the exhaust valve of the selected cylinder are closed. The engine may be spun at a speed that is lower than an engine cranking speed, such as at a speed of 300 RPM, until the cylinder piston is in a position where the timing angle is around the top (or TDC) of an exhaust stroke. In another example, the engine is spun slowly until a position of complete negative intake to exhaust valve overlap is reached.

Figure 3:
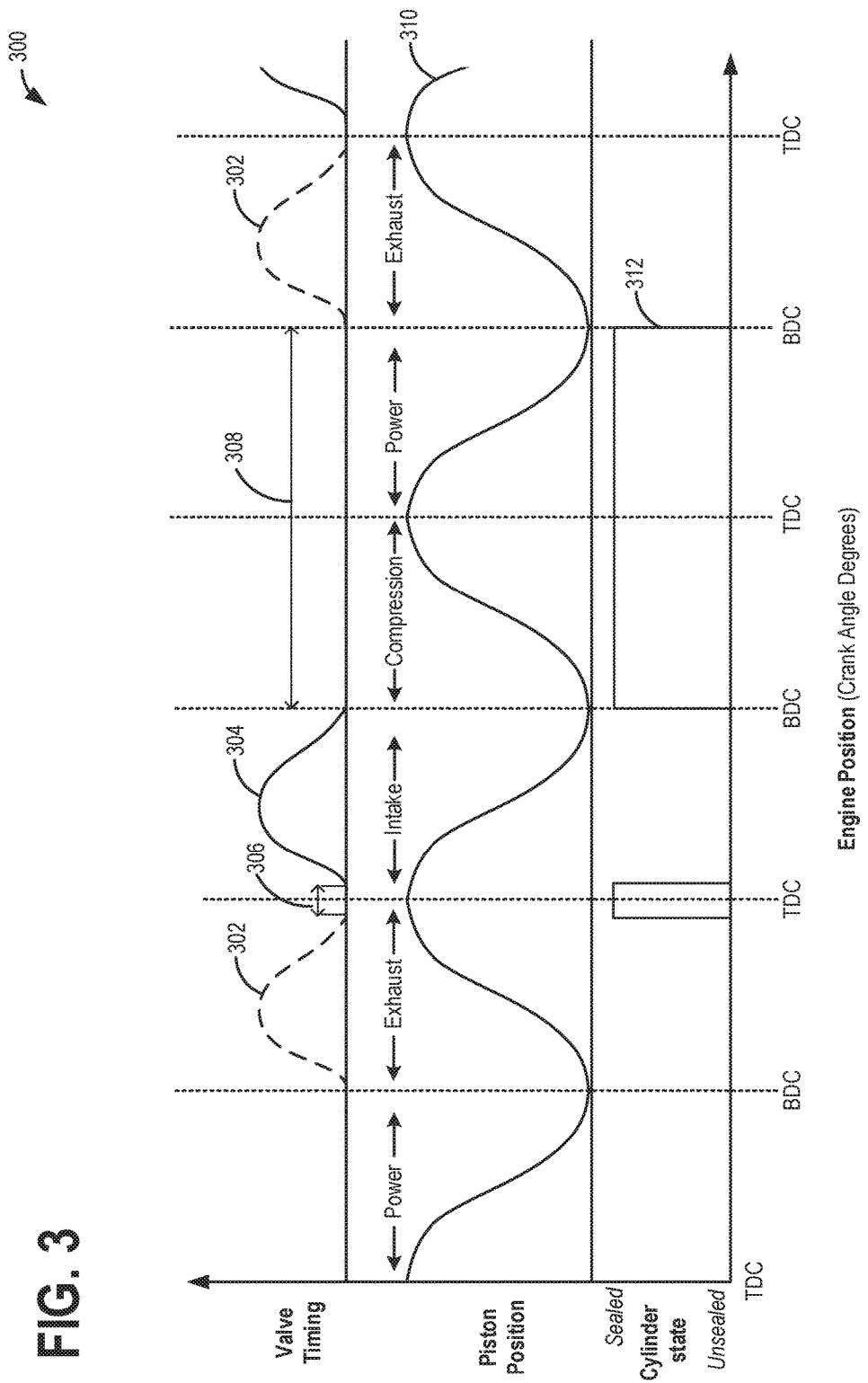
FIG. 3 shows an example map for selecting a cylinder position where laser-based cylinder heating can be initiated.

In one example, the controller may refer to a map, such as example map 300 of FIG. 3, to select a position where the cylinder is sealed. Turning briefly to FIG. 3, map 300 depicts valve timing and piston position, with respect to an engine position, for a given engine cylinder. Map 300 illustrates an engine position along the x-axis in crank angle degrees (CAD). Curve 310 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 310, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 302 and 304 depict valve timings for an exhaust valve (dashed curve 302) and an intake valve (solid curve 304) during engine operation. As illustrated, an exhaust valve may be opened just as the piston bottoms out at the end of the power stroke. The exhaust valve may then close as the piston completes the exhaust stroke. In the same way, an intake valve may be opened at or before the start of an intake stroke, and may close just as the piston bottoms out at the end of the intake stroke. As a result of the timing differences between exhaust valve closing and intake valve opening, for a short duration depicted herein at 306, before the end of the exhaust stroke and after the commencement of the intake stroke, both intake and exhaust valves of the given cylinder may be closed. This period, during which both valves may be closed, is referred to as a negative intake to exhaust valve overlap 306 (or simply, negative valve overlap). During this time, the cylinder is sealed to the atmosphere, as indicated at plot 312. During a knock sensor diagnostic, a cylinder corresponding to the knock sensor may be parked in a position within the region of negative valve overlap 306 so that a laser can be operated in the sealed cylinder to trap heat therein. As shown, the region of negative valve overlap 306 corresponds to exhaust stroke TDC for the cylinder.

Alternatively, the cylinder may be sealed by parking within region 308. Region 308 corresponds to another region where the cylinder is sealed. Region 308 is a duration between intake valve closing and exhaust valve opening where both intake and exhaust valves of the given cylinder may be closed. Herein, the intake stroke and exhaust stroke being referred to are for the same combustion event/cycle while in the case of the negative valve overlap region 306, the intake stroke is for a combustion event/cycle immediately following the combustion event/cycle of the exhaust stroke.

In one example, the engine controller may park the cylinder in a position within negative valve overlap 306 during the knock sensor diagnostic to take advantage of the smaller amount of air trapped inside the sealed cylinder. This may allow for improved heating of the trapped air during laser operation. In another example, the controller may seal the cylinder in a position within region 308 to use cylinder compression heating (due to the movement of the piston within the cylinder during the compression stroke) to enhance heat generation during the knock sensor diagnostic.

Returning to FIG. 2, at 212, a laser ignition device of the selected cylinder is operated for a duration in the sealed cylinder to generate heat. In particular, the laser ignition device is operated at the higher (or highest) power intensity, normally used for initiating cylinder combustion. The laser may be operated for a duration based on one or more of engine temperature and humidity. The controller may refer to a look-up table wherein the laser activation time is indexed as a function of cylinder head temperature. Thus, a duration of laser active required to achieve a target cylinder temperature may be retrieved from the look-up table. For example, the duration may be between 30 and 60 seconds. In another example, the duration of operating the laser is a predefined duration for the knock sensor diagnostic, such as 3 minutes. In still another example, the laser may be operated for an entirety of the duration over which the engine is held shut-down, in idle-stop, with the selected cylinder sealed. The engine controller may also adjust a location where the laser beam is focused, including a beam direction and a focal point of the beam. In one example, where the laser is maneuverable, the laser beam may be focused on different regions of the cylinder, in random directions, so as to strike all areas of the cylinder. Alternatively, the laser beam may be directed towards cylinder walls. Since the deactivated cylinder is sealed by its parking state, with both intake and exhaust valves closed, the heat energy generated by the laser operation is trapped inside the sealed cylinder. Operating the laser for the duration may include the controller sending a duty cycle or pulse-width signal to the laser exciter to operate the laser at its highest power setting for the defined duration. After the duration of operation, the laser is disabled.

At 214, it is determined if engine restart conditions are met. The engine controller may automatically, and without operator input, restart the engine responsive to restart conditions being met. Engine restart conditions may be confirmed if a battery state of charge is below a threshold (e.g., less than 30%), a request for air-conditioner compressor operation is received (e.g., a request for cabin cooling), engine temperature (for example, as inferred from an engine coolant temperature) is below a threshold temperature (such as below a catalyst light-off temperature), a throttle opening degree is more than a threshold, driver requested torque is more than a predetermined threshold value, brake pedal has been released, etc. If any of the restart conditions are met, then the engine may be restarted. If any of the engine restart conditions are not met, then at 216, the method includes maintaining the engine shut-down. In addition, laser operation may be maintained in the selected cylinder to continue to generate and trap heat in the cylinder so that the knock sensor can be diagnosed when the engine is subsequently restarted. The method then ends.

If engine restart conditions are met, then at 218, the method includes enabling fuel delivery and spark to all cylinders of the engine. Enabling fuel delivery and spark may include actuating a fuel pump to provide fuel to fuel injectors at a high pressure. Similarly, enabling spark may include enabling a spark advance or spark retard signal to be transmitted from the controller to the laser ignition system. By enabling fuel delivery and spark, combustion may be initiated in the engine cylinders.

At 220, the method includes advancing spark timing in the selected cylinder (that was heated via the laser during the preceding idle-stop). Spark timing may be advanced in the selected cylinder relative to a default timing or optimum timing for the engine operating conditions at the given engine restart. In addition, spark timing may be advanced in the selected cylinder relative to remaining engine cylinders. For example, if engine operating conditions at the engine restart require the use of spark advance in all cylinders, more spark advance may be applied in the selected cylinder as compared to each of the remaining cylinders. The amount of spark advance applied to the selected cylinder may be based on engine temperature and humidity. Alternatively, a fixed amount of spark advance may be applied to the selected cylinder. In one example, spark timing may be advanced from MBT in the given cylinder by 20 degrees. The combination of trapped heat in the cylinder (from the laser operation during the preceding idle-stop) and spark advance causes knock to be induced in the cylinder. In particular, knock is actively induced via the generated and trapped heat, and the use of spark advance, even though the engine is not operating in a high load condition. By actively inducing the knock, and monitoring the knock sensor's response to the induced knock, the sensor can be reliably diagnosed.

At 222, the method includes determining if knock is detected at the knock sensor being diagnosed. For example, it may be determined if the output of the knock sensor is higher than a threshold. The threshold may be a non-zero threshold. The knock threshold applied during the knock sensor diagnostic may be the same as the threshold used during engine operation for knock detection. Alternatively, the knock threshold applied during the knock sensor diagnostic may be higher or lower than the threshold used during engine operation for knock detection.

If knock is detected at the knock sensor, then at 228, the method includes indicating that the knock sensor is not degraded. At 230, responsive to the indication of no degradation, the induced knock may be mitigated by retarding spark timing in the knocking cylinder (which herein is the selected cylinder that was heated and wherein additional spark advance was applied). For example, spark timing may be retarded in the given cylinder to a default timing such as MBT, or to the same timing as all the remaining cylinders.

If knock is not detected at the knock sensor after inducing knock in the selected cylinder, then at 224, the method includes indicating that the knock sensor is degraded. For example, a diagnostic code may be set and/or a malfunction indicator light may be set to indicate that the knock sensor is degraded. In addition, at 226, responsive to the indication of knock sensor degradation, engine load may be limited. This includes limiting a maximum amount of air charge that can be delivered to the cylinder. By limiting engine load, engine knock occurrence is reduced to compensate for the inability of the engine controller to rely on the knock sensor to detect actual knock occurrence.

From each of 230 and 226, the method moves to 232 to determine if all engine knock sensors have been diagnosed, in the event that the engine has multiple knock sensors coupled along the engine block. If yes, then at 236, the knock sensor diagnostic data (results of the diagnostic run, when the run was attempted, if the run was completed, etc.) is stored and updated into the memory of the controller. Else, if there are any knock sensors that remain to be diagnosed, the method moves to 234 to select a next knock sensor (e.g., a second sensor) to perform the diagnostic routine in, opportunistically, during the next start/stop event. The method may then resume when engine idle-stop conditions are next met to diagnose the next knock sensor. Following 234 and 236, method 200 ends.

Turning now to FIG. 4, a prophetic example timeline 400 for diagnosing a knock sensor by actively inducing knock via laser generated heat is shown. In one example, the knock sensor diagnostic may be performed according to the example method of FIG. 2.

Timeline 400 depicts engine rotation speed (Ne) at plot 402, engine fueling (on or off) at plot 404, laser ignition operation at plot 406, and spark timing (for a first or a second cylinder) at plot 408. A piston position of a first cylinder is shown at plot 410 (dashed line), a piston position of a second cylinder is shown at plot 412 (solid line), the output of a knock sensor is shown at plot 414, and an on-board diagnostic (OBD) flag state is shown at plot 416. For all of the above, the horizontal axis represents time, with time increasing along the horizontal axis from left to right. The vertical axis represents each labeled parameter. In plots 404 and 406, the vertical axis represents whether engine fueling and laser ignition, respectively, are "on" (e.g., actively operating, with a non-zero voltage supplied) or "off" (e.g., deactivated and not operating, with no voltage supplied). In plot 416, the vertical axis represents whether a flag indicating knock sensor degradation is set (indicating that the sensor is degraded) or not (indicating that the sensor is not degraded). In plots 402 and 414, the vertical axis represents, respectively, an amount of increase or decrease of engine speed and knock sensor output. For plots 410 and 412, the vertical axis shows the piston position from bottom dead center ("BDC") to top dead center ("TDC"). For plot 408, the vertical axis indicates an amount of spark timing advance (upwards relative to reference MBT) or spark retard (downwards relative to reference MBT).

Prior to time t1, the engine is operating fueled (plot 404), and spinning at an engine speed (plot 402) that meets the torque demand. The engine is operating with laser ignition activated (plot 406) and spark timing substantially at or around MBT (plot 408). As the engine is rotated (e.g., cranked), a piston within each cylinder of the engine travels between BDC and TDC. For example, for each 360 degree rotation of the crankshaft, the piston may travel from BDC to TDC and back to TDC. The piston of a first cylinder (plot 410) is 180 degrees out of phase of a second cylinder (plot 412) such that the piston of the first cylinder is at TDC when the piston of the second cylinder is at BDC (and vice versa). For example, the engine may be an inline-four cylinder engine. The engine is not knocking prior at t1, as indicated by the knock sensor output (plot 414) being below knock threshold 415 (dashed line). Accordingly, no OBD flag is set (plot 416).

At time t1, in response to idle-stop conditions (as determined based on engine speed and load, for example), the controller initiates an engine idle-stop operation wherein engine fueling and laser ignition is disabled. This allows the engine to start spinning to rest. The engine is configured with two knock sensors, a first knock sensor coupled to the first cylinder, and a second knock sensor coupled to the second cylinder. At t1, while the engine is being shut-down, it may be determined that a diagnostic may be run on the first knock sensor, according to the routine of FIG. 2. To do so, between t1 and t2, as the engine spins to rest, the engine spin-down profile is adjusted so that the engine comes to rest with the first cylinder sealed at a position where both the intake valve and the exhaust valve of the cylinder are closed. For example, the engine is spun down such that the first cylinder is parked at TDC of exhaust stroke (plot 410, dashed line) when the engine comes to rest.

After parking the first cylinder at the selected position, between t2 and t3, the laser ignition device of the first cylinder is operated at a high power setting. By operating the laser ignition device between t2 and t3, heat is generated in the first cylinder. Since the first cylinder is parked in a sealed state, the generated heat is also trapped in the first cylinder, causing the in-cylinder temperature to rise.

At t4, engine restart conditions are met, such as due to an increase in torque demand. Responsive to the engine restart request, engine fueling and ignition is resumed. In particular, on the engine restart, the first cylinder is operated with spark timing advanced from MBT (see plot 408 between t3 and t4) while remaining engine cylinders are operated with spark timing at MBT (not shown). The combination of trapped heat in the first cylinder with spark advance causes knock to be induced in the first cylinder. The knock is detected by the first knock sensor, as indicated by first knock sensor output exceeding threshold 415 between t3 and t4. In response to knock detection by the knock sensor following the induced knock, it is determined that the first knock sensor is functional and no flag is set.

Between t4 and t5, engine operation continues until at t5, idle-stop conditions are met once again. Responsive to the idle-stop conditions, the controller initiates another engine idle-stop operation by disabling engine fueling and laser ignition. This causes the engine to start spinning to rest. At t5, while the engine is being shut-down, it may be determined that a diagnostic may be run on the second knock sensor, according to the routine of FIG. 2. To do so, between t5 and t6, as the engine spins to rest, the engine spin-down profile is adjusted so that the engine comes to rest with the second cylinder sealed at a position where both the intake valve and the exhaust valve of the cylinder are closed. For example, the engine is spun down such that the second cylinder is parked at TDC of exhaust stroke (plot 412, solid line) when the engine comes to rest.

After parking the second cylinder at the selected position, between t6 and t7, the laser ignition device of the second cylinder is operated at a high power setting. By operating the laser ignition device between t6 and t7, heat is generated in the second cylinder. Since the second cylinder is parked in a sealed state, the generated heat is also trapped in the second cylinder, causing the in-cylinder temperature to rise.

At t7, engine restart conditions are met, such as due to an increase in torque demand. Responsive to the engine restart request, engine fueling and ignition is resumed. In particular, on the engine restart, the second cylinder is operated with spark timing advanced from MBT (see plot 408 after t7) while remaining engine cylinders are operated with spark timing at MBT (not shown). The combination of trapped heat in the second cylinder with spark advance causes knock to be induced in the second cylinder. The induced knock is not detected by the second knock sensor, as indicated by second knock sensor output remaining below threshold 415 after t7. In response to no knock being detected by the knock sensor following the induced knock, it is determined that the second knock sensor is functional and a flag is set indicating degradation of the second knock sensor. Optionally, an engine load may be limited responsive to the indication of degradation. For example, a maximum allowable throttle opening or air charge received in the engine may be limited.

In this way, as shown in the example of FIG. 4, an engine controller may operate a laser ignition system in an unfueled cylinder while an engine is at rest, the cylinder parked in a position with each of an intake and an exhaust valve closed; restart the engine by resuming fueling to the cylinder with spark timing advanced; and indicate knock sensor degradation responsive to lower than threshold knock sensor output following the restarting. Further, the controller may reducing an intake aircharge to limit an engine load responsive to the indicating knock sensor degradation. The controller may select the cylinder based on a location of the cylinder relative to the knock sensor on an engine block, the selected cylinder located closer to the knock sensor relative to remaining engine cylinders. In one example, the cylinder position includes an end of an exhaust stroke of the cylinder, inside of a region of negative intake to exhaust valve overlap. The controller may disable engine fueling responsive to idle-stop conditions being met, and rotate the engine, unfueled, via an electrically actuated motor, to the position where the exhaust valve and the intake valve of the cylinder is closed, and then disable engine rotation via the motor. Operating the laser ignition system may include operating the laser ignition at a high power setting used for initiating cylinder combustion. In one example, the controller may also adjust a degree of spark advance applied during the restarting based on engine temperature, such as inferred based on cylinder head temperature. In one example, spark is advanced by 5-10 degrees.

In this way, an engine knock sensor may be diagnosed during an engine restart by actively inducing knock in a corresponding engine cylinder. By actively inducing the knock, the need to wait for high load engine operating conditions where engine knock occurs is reduced, enabling knock sensor diagnostics to be performed over a wider range of operating conditions. By inducing the knock via laser ignition generated heat over an idle-stop, and spark advance applied during a subsequent restart, knock sensor diagnostics can be reliably performed during city drive cycles. By leveraging an existing laser ignition to generate heat in a sealed engine cylinder, knock can be induced existing engine components. By correlating changes in knock sensor output with actively induced knock, a knock sensor can be reliably diagnosed. By diagnosing a knock sensor in a timely manner, adaptive spark retard can be better scheduled, improving engine fuel economy and engine performance. In addition, tailpipe emissions can be improved and on-board diagnostic requirements can be better met.

One example method for an engine comprises: inducing a knock event in a cylinder via operation of a laser ignition device; and diagnosing a knock sensor based on knock sensor output following the induced knock event. In the preceding example, additionally or optionally, the method further comprises selecting the cylinder based on a position of the cylinder relative to a position of the knock sensor on an engine block. In any or all of the preceding examples, additionally or optionally, the selecting includes selecting the cylinder that is closest to the knock sensor relative to remaining engine cylinders. In any or all of the preceding examples, additionally or optionally, the diagnosing includes indicating knock sensor degradation responsive to a lower than threshold knock sensor output following the induced knock event. In any or all of the preceding examples, additionally or optionally, the method further comprises, responsive to the indicating, reducing an intake air charge to limit an engine load. In any or all of the preceding examples, additionally or optionally, the knock event is further induced via application of spark advance in the cylinder. In any or all of the preceding examples, additionally or optionally, the inducing includes: during an engine shutdown, spinning the engine to rest at a position where the cylinder is sealed with each of an intake and an exhaust valve closed; operating the laser ignition device in the sealed cylinder for a duration while the engine is at rest; and during a subsequent engine restart, resuming fuel delivery to the cylinder with spark timing of the cylinder advanced from MBT. In any or all of the preceding examples, additionally or optionally, the duration of operating the laser ignition device in the cylinder is based on target cylinder temperature and wherein an amount of spark advance applied to the cylinder is based on engine temperature. In any or all of the preceding examples, additionally or optionally, the position where the cylinder is sealed includes top dead center of an exhaust stroke of the cylinder. In any or all of the preceding examples, additionally or optionally, spinning the engine to rest at a position where the cylinder is sealed includes adjusting an engine spin-down speed profile, via an electric motor, to park the cylinder in the sealed position when the engine is at rest.

Another example method comprises: operating a laser ignition system in an unfueled cylinder while an engine is at rest, the cylinder parked in a position with each of an intake and an exhaust valve closed; restarting the engine by resuming fueling to the cylinder with spark timing advanced; and indicating knock sensor degradation responsive to lower than threshold knock sensor output following the restarting. In the preceding example, additionally or optionally, the method further comprises reducing an intake air charge to limit an engine load responsive to the indicating knock sensor degradation. In any or all of the preceding examples, additionally or optionally, the method further comprises selecting the cylinder based on a location of the cylinder relative to the knock sensor on an engine block, the selected cylinder located closer to the knock sensor relative to remaining engine cylinders. In any or all of the preceding examples, additionally or optionally, the position includes an end of an exhaust stroke of the cylinder, inside of a region of negative intake to exhaust valve overlap. In any or all of the preceding examples, additionally or optionally, the method further comprises disabling engine fueling responsive to idle-stop conditions being met, and rotating the engine, unfueled, via an electrically actuated motor, to the position where the exhaust valve and the intake valve of the cylinder is closed, and then disabling engine rotation via the motor. In any or all of the preceding examples, additionally or optionally, operating the laser ignition system includes operating the laser ignition at a high power setting used for initiating cylinder combustion. In any or all of the preceding examples, additionally or optionally, the method further comprises adjusting a degree of spark advance applied during the restarting based on cylinder head temperature.

Another example vehicle system comprises: an engine including a cylinder, the cylinder having a laser ignition device and a fuel injector; a knock sensor coupled to an engine block; and a controller with computer readable instructions stored on non-transitory memory for: disabling fuel to an engine and spinning the engine to rest with the cylinder parked in a position with an intake and an exhaust valve closed; operating the laser ignition device coupled to the cylinder to raise cylinder temperature to above a threshold temperature; resuming fuel delivery to the engine and combusting fuel in the cylinder with an amount of spark timing advance; and indicating degradation of the knock sensor based on sensor output following the resuming. In the preceding example, additionally or optionally, the cylinder is one of a plurality of engine cylinders, and wherein the controller includes further instructions for selecting the cylinder from the plurality of cylinders based on a location of the cylinder relative to the knock sensor on the engine block. In any or all of the preceding examples, additionally or optionally, the position where the cylinder is parked includes a top dead center of an exhaust stroke of the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   inducing a knock event in a cylinder via operation of a laser ignition device; and
   diagnosing a knock sensor based on knock sensor output following the induced knock event.

2. The method of claim 1, further comprising, selecting the cylinder based on a position of the cylinder relative to a position of the knock sensor on an engine block.

3. The method of claim 2, wherein the selecting includes selecting the cylinder that is closest to the knock sensor relative to remaining engine cylinders.

4. The method of claim 1, wherein the diagnosing includes indicating knock sensor degradation responsive to a lower than threshold knock sensor output following the induced knock event.

5. The method of claim 4, further comprising, responsive to the indicating, reducing an intake air charge to limit an engine load.

6. The method of claim 1, wherein the knock event is further induced via application of spark advance in the cylinder.

7. The method of claim 6, wherein the inducing includes:
   during an engine shutdown, spinning the engine to rest at a position where the cylinder is sealed with each of an intake and an exhaust valve closed;
   operating the laser ignition device in the sealed cylinder for a duration while the engine is at rest; and
   during a subsequent engine restart, resuming fuel delivery to the cylinder with spark timing of the cylinder advanced from MBT.

8. The method of claim 7, wherein the duration of operating the laser ignition device in the cylinder is based on target cylinder temperature and wherein an amount of spark advance applied to the cylinder is based on engine temperature.

9. The method of claim 7, wherein the position where the cylinder is sealed includes top dead center of an exhaust stroke of the cylinder.

10. The method of claim 7, wherein spinning the engine to rest at a position where the cylinder is sealed includes adjusting an engine spin-down speed profile, via an electric motor, to park the cylinder in the sealed position when the engine is at rest.

11. A method, comprising:
    operating a laser ignition system in an unfueled cylinder while an engine is at rest, the cylinder parked in a position with each of an intake and an exhaust valve closed;
    restarting the engine by resuming fueling to the cylinder with spark timing advanced; and
    indicating knock sensor degradation responsive to lower than threshold knock sensor output following the restarting.

12. The method of claim 11, further comprising, reducing an intake aircharge to limit an engine load responsive to the indicating knock sensor degradation.

13. The method of claim 11, further comprising selecting the cylinder based on a location of the cylinder relative to the knock sensor on an engine block, the selected cylinder located closer to the knock sensor relative to remaining engine cylinders.

14. The method of claim 11, wherein the position includes an end of an exhaust stroke of the cylinder, inside of a region of negative intake to exhaust valve overlap.

15. The method of claim 11, further comprising, disabling engine fueling responsive to idle-stop conditions being met, and rotating the engine, unfueled, via an electrically actuated motor, to the position where the exhaust valve and the intake valve of the cylinder is closed, and then disabling engine rotation via the motor.

16. The method of claim 11, wherein operating the laser ignition system includes operating the laser ignition at a high power setting used for initiating cylinder combustion.

17. The method of claim 11, further comprising, adjusting a degree of spark advance applied during the restarting based on cylinder head temperature.

18. A vehicle system, comprising:
    an engine including a cylinder, the cylinder having a laser ignition device and a fuel injector;
    a knock sensor coupled to an engine block; and
    a controller with computer readable instructions stored on non-transitory memory for:
    disabling fuel to an engine and spinning the engine to rest with the cylinder parked in a position with an intake and an exhaust valve closed;
    operating the laser ignition device coupled to the cylinder to raise cylinder temperature to above a threshold temperature;

resuming fuel delivery to the engine and combusting fuel in the cylinder with an amount of spark timing advance; and indicating degradation of the knock sensor based on sensor output following the resuming.

19. The system of claim 18, wherein the cylinder is one of a plurality of engine cylinders, and wherein the controller includes further instructions for selecting the cylinder from the plurality of cylinders based on a location of the cylinder relative to the knock sensor on the engine block.

20. The system of claim 18, wherein the position where the cylinder is parked includes a top dead center of an exhaust stroke of the cylinder.

* * * * *